(12) United States Patent
Rice et al.

(10) Patent No.: US 8,018,647 B2
(45) Date of Patent: Sep. 13, 2011

(54) IMAGING SYSTEMS AND METHODS

(75) Inventors: Robert Rex Rice, Simi Valley, CA (US); Mark Alan Folkman, Redondo Beach, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 737 days.

(21) Appl. No.: 11/684,956

(22) Filed: Mar. 12, 2007

(65) Prior Publication Data

US 2008/0225288 A1 Sep. 18, 2008

(51) Int. Cl.
*H01L 31/0232* (2006.01)
*H01S 3/00* (2006.01)

(52) U.S. Cl. ............... 359/334; 250/330; 250/338.1; 250/338.4; 250/342

(58) Field of Classification Search .............. 359/334; 250/330, 338.1, 338.4, 342
See application file for complete search history.

(56) References Cited

U.S. PATENT DOCUMENTS

| | | | | |
|---|---|---|---|---|
| 4,988,859 | A * | 1/1991 | Tsuchiya et al. | 250/214 VT |
| 5,275,168 | A * | 1/1994 | Reintjes et al. | 600/476 |
| 5,450,125 | A | 9/1995 | Ulich et al. | |
| 6,509,566 | B1 | 1/2003 | Wamsley et al. | |
| 6,900,890 | B1 * | 5/2005 | Rice | 356/301 |
| 6,901,084 | B2 * | 5/2005 | Pask et al. | 372/3 |
| 6,943,884 | B2 | 9/2005 | Rice | |
| 7,116,415 | B2 | 10/2006 | Iuliano | |
| 2002/0156380 | A1* | 10/2002 | Feld et al. | 600/473 |
| 2005/0053104 | A1* | 3/2005 | Kulp et al. | 372/23 |
| 2005/0207943 | A1 | 9/2005 | Puzey | |
| 2006/0050744 | A1* | 3/2006 | Wong et al. | 372/3 |
| 2008/0170289 | A1* | 7/2008 | Rice et al. | 359/334 |

OTHER PUBLICATIONS

Calmes, et al.: "Solid-State Raman Image Amplification"; SPIE Conference on Advances in Laser Remote Sensing for Terrestrial and Hydrographic Applications, Apr. 1998 vol. 3382.
Murray, et al.: "Applications of Solid-State Raman Lasers"; IEEE 1997, 0-7803-3895-2/97.
Duncan, et al.: "Low-Light-Level, Quantum-Noise-Limited Amplification in a Stimulated Raman Amplifier"; vol. 9, Nov. 11, 1992, J. Opt. Soc. Am. B.
Calmes, et al.: "Marine Raman Image Amplification"; SPIE Confernece on Airborne andIn-Water Underwater Imaging Jul. 1999 Vo. 3761 0277-786X.
EP Search Report for corresponding EP 08 10 2507, completed Jun. 23, 2008 by Veronika Besser, Munich.
Jalali, et al.: "*Multi-Mode Mid-Ir Silicon Raman Amplifiers*"; Group IV Semiconductor Nanostructures, 2006 Symposium, 2006, pp. 37-47, XP002485209; *whole document*.
Duncan, et al.: "*Time-Gated Imaging Through Scattering Media Using Stimulated Raman Amplification*"; Optics Letters, vol. 16, No. 23, Dec. 1, 1991, pp. 1868-1870, XP002485211; *whole document*.
Freidman, et al.: "*Prospects of Using Parametric and SRS Oscillators and Amplifiers for Remote Spectroscopy of the Atmosphere and Image Amplification*"; Proceedings of the SPIE, vol. 2797, May 1996, pp. 299-310, XP002485212; *whole document*.
Raghunathan, et al.: *A Self-Imaging Silicon Waveguide Raman Amplifier;* OSA Adv. Solid State Phon. Conf., ASSP 2007, Jan. 2007, pp. 1-3, XP002485213; *whole document*.

* cited by examiner

*Primary Examiner* — Eric Bolda
(74) *Attorney, Agent, or Firm* — Tarolli, Sundheim, Covell & Tummino LLP

(57) ABSTRACT

Imaging systems and methods are provided. In one embodiment, an image system is disclosed that comprises a Raman gain medium configured to receive an image from a target area and a tunable laser configured to pump light into the Raman gain medium over a plurality of first wavelengths to induce amplification of the image over a plurality of second wavelengths strokes shifted from the plurality of first wavelengths. The image system further comprises an image detector system that receives and processes the amplified image over the plurality of second wavelengths.

16 Claims, 4 Drawing Sheets

IMAGING SYSTEMS AND METHODS

TECHNICAL FIELD

The present invention relates generally to optics, and more particularly to imaging systems and methods.

BACKGROUND

Many image systems exist that employ local or remote non-destructive sensing of spectrally dependent properties of substances for identifying the presence of one or more substances. These substances could include, for example, gases, chemicals, minerals, pollutants, and objects both man-made and natural in the form of a gas, liquid or solid. Examples of local sensing and identifying methods that have been used to detect spectral properties include ion mobility spectrometry, flame photometry, mass spectrometry, electrochemistry, detection paper methods, surface acoustic wave methods, laser-induced breakdown spectroscopy, photo ionization detection, gas chromatography and cavity-ring-down spectroscopy. Local sensing and identifying systems and methods are limited by the ability to retrieve a sample or locate detection equipment near a target area.

Examples of conventional remote detectors include Raman spectroscopy, forward looking infrared (FLIR) detectors and differential absorption light detection and ranging (LiDAR) (DIAL) detectors. Raman based sensors illuminate samples with ultraviolet light and look for a Raman shift in the reflected signal. Unfortunately, the absorption of the atmosphere strongly absorbs the ultraviolet light severely limiting the range and sensitivity of such systems. Furthermore, only a limited number of chemical compounds can be detected. A FLIR sensor uses a FLIR detector array and a set of filters that allows a user to visually detect the presence of certain substances. The sensitivity and selectivity of FLIR detection are highly dependent on a user's ability to interpret contrasts created in the visual field by looking at a scene using various different filters. Such FLIR based systems are frequently referred to as HyperSpectral Imagers (HIS) or MultiSpectral Imagers. Many DIAL sensors use carbon dioxide lasers to identify chemical substances. One drawback of carbon dioxide lasers is that they are limited to using the spectral lines available from the carbon dioxide gain media. This limited wavelength selection limits the sensitivity and selectivity of prior art DIAL sensors.

SUMMARY

In one aspect of the invention, an image system is provided. The image system comprises a Raman gain medium configured to receive an image from a target area and a tunable laser configured to pump light into the Raman gain medium over a plurality of first wavelengths to induce amplification of the image over a plurality of second wavelengths Stokes shifted from the plurality of first wavelengths. The image system further comprises an image detector system that receives and processes the amplified image over the plurality of second wavelengths.

In another aspect of the invention, an image system is provided. The image system comprises a preamplifier that comprises a Raman gain medium crystal configured to receive an image from a target area, and tunable laser configured to pump light into the Raman gain medium over a plurality of pump wavelengths to induce amplification of the image over a plurality of wavelengths of interest. The image system further comprises a combining component that combines the image from the target area and the pump light from the tunable laser and an image detector system that receives and processes the amplified image over the plurality of wavelengths of interest.

In yet another aspect of the invention, a method is provided for detecting substances in a target area. The method comprises positioning an image system to receive an image from a target area on a Raman gain medium and pumping light into the Raman gain medium over a plurality of pump wavelengths to induce amplification of the image over a plurality of wavelengths of interest. The method further comprises receiving and processing the amplified image signal over the plurality of wavelengths of interest to determine a signature of high gain spectral features of the image, and analyzing the signature of high gain spectral features to determine a type of substance present in the target area.

DETAILED DESCRIPTION

Imaging systems and methods are provided. The image systems and methods employ a preamplifier that includes a Raman gain medium configured to receive an image from a target area and a tunable laser configured to pump light into the Raman gain medium. In one aspect of the invention, a tunable pump provides light over a plurality of first or pump wavelengths to induce amplification of the image over a plurality of second wavelengths of interest that are Stokes shifted from the plurality of first wavelengths. The image system can further comprise an image detector system that receives and processes the amplified image over the plurality of second wavelengths of interest. The images formed at the plurality of second wavelengths of interest can be employed to obtain a signature of high gain spectral features that can be employed to determine one or more types of substances present in a target area, such as one or more chemical or biological agents.

Figure 1:
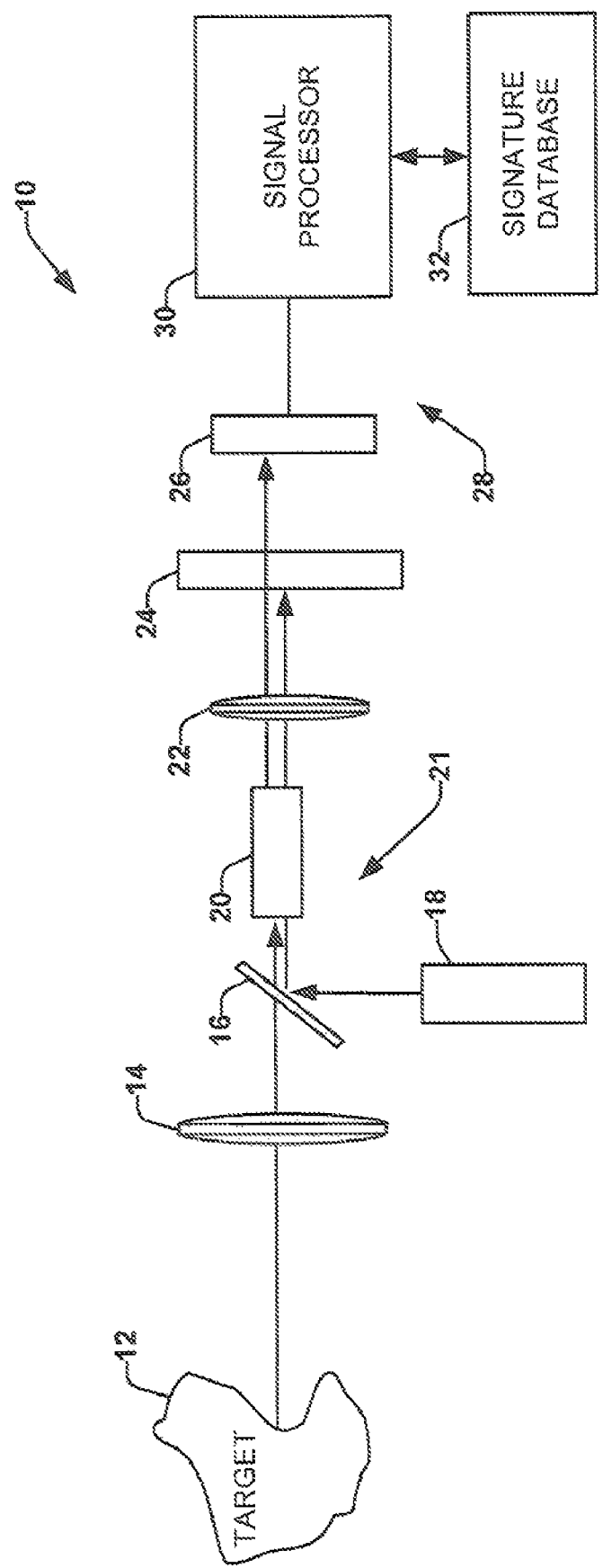
FIG. 1 illustrates a block diagram of an imaging system in accordance with an aspect of the present invention.

FIG. 1 illustrates an imaging system 10 in accordance with an aspect of the present invention. The imaging system 10 is a passive system, such that the imaging system 10 includes a receiver but does not require a transmitter with an active illumination device to illuminate images during detection and capturing of the images. The imaging system 10 includes a Raman gain medium 20 configured to receive an image from a target area 12 and a tunable laser 18 configured to pump light into the Raman gain medium 20 over a plurality of pump wavelengths to induce amplification of the image over a plurality of wavelengths of interest. The image system 10 can be configured as a multi-spectral image system or a hyperspectral image system based on the number of the plurality of wavelengths of interest. Each of the plurality of wavelengths of interest are Stokes shifted from a respective one of the plurality of pump wavelengths. In this manner, the tunable laser 28 can be employed to continuously or discretely pump light into the Raman gain medium 20 over one or more wavelength bands to provide signal gain to the image over one or more wavelength bands of interest in which spectral features of the image can provide useful information, such as the presence of a given substance in the target area 12.

The image system 10 includes a receiving telescope lens 14 and a beam combiner 16 (e.g., dichroic beam splitter). The beam combiner 16 is configured to allow light from the target area 12 at the wavelengths of interest to pass through to the Raman gain medium 20 and reflect the light at the pump wavelengths from the tunable laser 18 to the Raman gain medium 20. The tunable laser 18, the Raman gain medium 20 and the beam combiner 16 form an image preamplifier 21. The pump wavelengths induce Raman gain of the image by the Raman gain medium 20 at the wavelengths of interest. Raman gain can be defined as optical gain caused from Stimulated Raman Scattering (SRS) that can occur in transparent solid medias, liquids and gases under the influence of intense pump light. The pump light is scattered with a reduced photon energy in the Raman gain medium 20 resulting in increased output wavelengths from the Raman gain medium 20. The process can be stimulated in the Raman gain medium by the presence of signal photons that are stokes shifted from the pump light wavelengths, thereby producing optical gain for the signal.

The tunable laser 20 can be, for example, an optical parametric oscillator (OPO) or other tunable laser, such as a $Cr^{+2}$:ZnSe crystal laser, that can provide pump wavelengths over pump wavelengths bands to provide the induced Raman gain and output wavelengths of interest of the Raman gain medium 20 based on a given application. In one aspect of the invention, the Raman gain medium 20 is a transparent crystal material that exhibits high gain at the output wavelengths of interest.

The wavelengths of interest output from the Raman gain medium 20 pass through relay optics 22 and a pump filter 24 to an image detection system 28. The pump filter 24 removes the pump wavelengths from the wavelengths of interest. The image detection system 28 includes an image detector 26 (e.g., a focal plane array (FPA)) and a signal processor 30. The image detector 26 captures image intensity pixel values of an image at a given wavelength over the plurality of wavelengths of interest. The relay optics 22 focuses the image on the image detector 26. The image intensity pixel values can be processed by the signal processor 30 to determine an image signature, for example, to determine one or more particular substances in the target area 12. Optionally, a signature spectral database 32 can be employed that includes a database of spectral signatures and substances that can be compared with the determined image spectral signature.

In one aspect of the invention, the image system can be employed as a system for detecting chemical and biological agents. It is to be appreciated that the image system can also be employed to detect other substances such as minerals, oil spills and pollutants to name a few. The tunable laser 18 sequentially amplifies light received from a target source over a set of target wavelengths of interest, for example, in the mid-wave infrared (MWIR) range. The target wavelengths are selected to correspond to absorption features of particular chemical and biological agents or species having high gain spectral features, such that chemical and biological image signatures can be employed to identify chemical or biological species over a target area. In one aspect of the invention, the Raman gain medium 29 is formed of a single crystal of silicon that can provide a relative high Raman gain (e.g., about 30 dB to about 50 dB gain) over a wavelength interval (e.g., from about 3.15 μm to about 3.65 μm) particularly useful for identifying chemical and biological species of interest. In another aspect of the invention, a plurality of discrete wavelength bands are scanned to avoid wavelengths of the atmospheric absorption spectra, thus reducing power employed to perform the scan.

The use of single crystal silicon as the Raman gain medium 20 enable very high Raman gain in the MWIR region of the spectrum, where spectral features of chemical and biological species of interest can be found. The use of silicon as the Raman gain medium is feasible for pump wavelengths longer than the two photon absorption edge (TPA), which occurs at about 2.3 μm. With a Stokes shift of 520 $cm^{-1}$ in silicon, pumping at 2706.7 nm enables image amplification at 3150 nm, and pumping at 3067.5 nm enables image amplification at 3650 nm. This is a very important wavelength interval (3150 nm to 3650 nm) in the identification of chemical and biological species or agents of interest. The generation of specific pump frequencies required for image amplification at predetermined signal frequencies is a problem with conventional solutions. It is to be appreciated that the light pumped into the single crystal silicon could consist of multiple frequencies simultaneously, giving a composite image comprising images at multiple signal frequencies if desired.

It is to be appreciated that the Raman gain medium 20 is not restricted to silicon in the MWIR, but rather can be implemented to a variety of signal frequency bands for which a transparent Raman media and appropriate tunable pump sources exist. Examples of materials that have high Raman gain coefficients include diamond, barium nitrate, silicon carbide, calcium tungstate, germanium, gallium phosphide and lithium niobate. Tunable laser include titanium sapphire, Yb:YAG, rare earth doped optical fibers (Nd, Yb, Yb/Er, Tm etc.), color center lasers (Cr:ZnS, Cr:ZnSe) and Raman crystal or fiber lasers. All may be employed to pump a passive image system, with or without active illumination.

Figure 2:
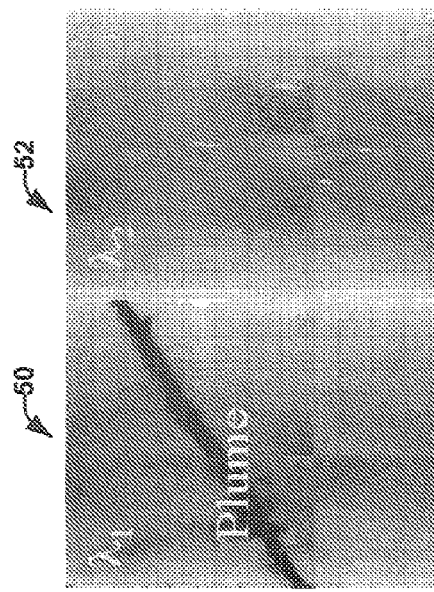
FIG. 2 illustrates an exemplary graph of gain versus optical wavelengths for employment of single crystal silicon as the Raman gain medium of FIG. 1.
Figure 3:
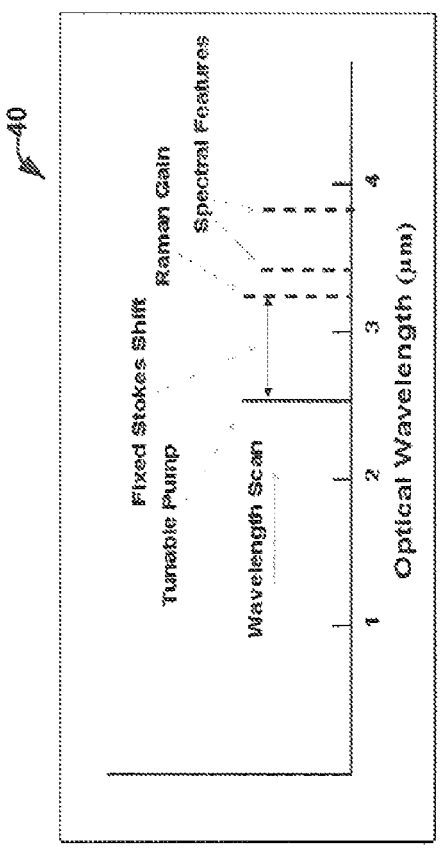
FIG. 3 illustrates a first captured image at a first wavelength and a second captured image at a second wavelength in accordance with an aspect of the present invention.

FIG. 2 illustrates an exemplary graph 40 of gain versus optical wavelength for employment of single crystal silicon as the Raman gain medium 20 of FIG. 1. As illustrated in the graph, the tunable laser performs a wavelength scan about the 2.5 μm to about 3.0 μm range which induces a Raman gain about the 3.15 μm to about the 3.65 μm range in which certain high gain spectral features of a given substance can be detected at wavelengths within the about 3.15 μm to the about 3.65 μm range. The high gain spectral features can be employed as signatures to determine the identity of the given substance. FIG. 3 illustrates a first captured image 50 at a first wavelength and a second captured image 52 at a second wavelength. As illustrated in FIG. 3, the first captured image at the first wavelength provides a high gain spectral feature in the form of a plume across a scene background, while the second captured image at the second wavelength does not exhibit a spectral feature but only the scene background. The image intensity values of the high gain spectral features of the image captured across a plurality of wavelengths can be employed to identify the substance, such as a chemical or biological agent in the target area.

Figure 4:
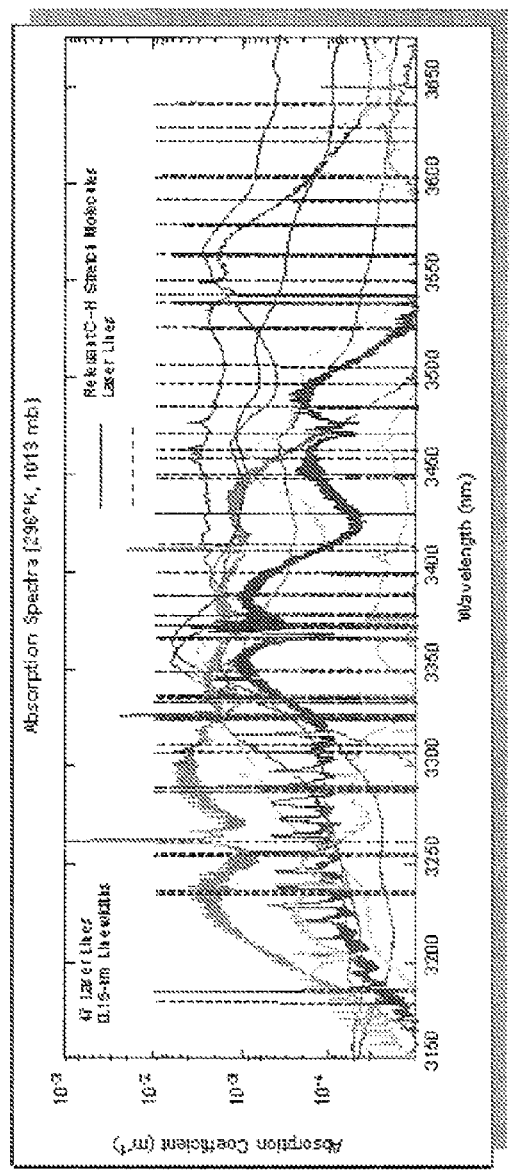
FIG. 4 illustrates an absorption spectra graph that can be employed to evaluate spectral feature signatures for a plurality of different chemical and biological agents.

FIG. 4 illustrates an absorption spectra graph 60 that can be employed to evaluate spectral feature signatures for a plurality of different chemical and biological agents. The graph 40 illustrates the spectral responses of agents based on a plot of their respective absorption coefficients over the 3150 nm to the 3650 nm range. The graph 60 also illustrates wavelengths where the absorption coefficient of the atmosphere is relatively high, as indicated by the vertical dash lines. The system 10 can be configured to scan discrete wavelength bands to avoid the wavelength in which the absorption coefficient of the atmosphere is relatively high. In this manner, power consumed and scan time of the system 10 can be reduced. The graph 60 can be employed to determine spectral feature signatures by storing image intensity values at wavelengths where peak values are obtained for a given chemical or biological agent. The spectral feature signatures can be stored in a database for comparing to actual captured image intensity values to determine substance types present in the target area 12. Additionally, the system 10 can be configured to scan certain wavelengths to look for certain substance types in a target area based on the predetermined spectral feature signatures.

The use of a self-imaging Raman multimode waveguide amplifier can provide additional gain by confining the optical fields tightly in a waveguide structure the process achieves enhanced gain at the expense of wavelength flexibility, that is, only signal wavelengths satisfying the self-imaging criterion, which depend on the properties of the waveguide. In general, resonant frequencies occur periodically, but there is no guarantee that the resonant frequencies will correspond to desired signal frequencies.

In the above example the passive imaging system employing a Raman image amplifier (i.e., tunable laser and Raman gain medium) is exploited to amplify an image collected by a passive optical system at specific important wavelengths. This system is described as passive because an active illumination source for the target area is not employed, rather light emitted thermally or scattered from incident sunlight provides scene illumination. This does not preclude the use of active illumination, however, but the pump frequency for the Raman image amplifier needs to be selected to amplify that active illumination frequency. It is to be appreciated that the passive system 10 can be configured as an active illumination system to further enhance system performance. In one aspect of the system, an illumination signal is provided to illuminate a target area with a light beam scanned over wavelengths in synchronization with the pump light wavelengths temporarily spaced from another based on a round trip delay time of the return image of the illumination signal at a respective wavelength. A temporal profile and timing of the first wavelength pumping signal on the Raman gain medium can be adjusted to provide range gating of the return signal to reject background and to provide a measure of the distance to the target. The measured distance can be employed to temporally space the illumination signal in synchronization with the corresponding pumping wavelength, such that the return illumination signal of a given wavelength is received at a substantially same time as a corresponding wavelength of the pumping signal.

The light from the target can be sequentially amplified in the Raman gain medium by pump light at wavelengths chosen to provide high gain, low noise amplification at the wavelengths of interest. These target wavelengths would be selected to provide information about the target, for instance, the wavelengths might be picked to correspond to absorption features of particular chemical and biological species such that a plume might appear bright or dark in the images. Much like with Lidar (Light Detection and Ranging) and Differential Absorption Lidar (DIAL), comparison of images collected at different wavelengths would enable identification of suspicious materials in the subject scene. The use of pulsed pumping of the Raman medium would enable range gating, such that pulsed active illumination at target wavelengths can be used in a DIAL like mode.

Figure 5:
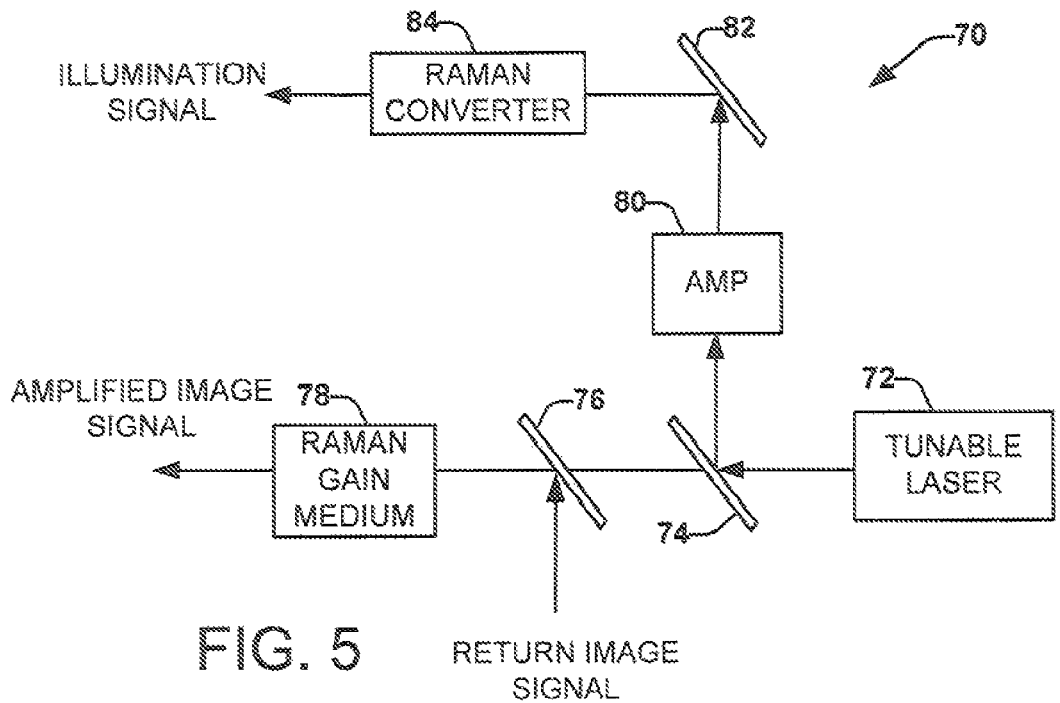
FIG. 5 illustrates a portion of an active illumination image system in accordance with an aspect of the present invention.

FIG. 5 illustrates a portion of an active illumination image system 70 in accordance with an aspect of the present invention. The image system 70 includes a tunable laser 72 that acts as a source for both pumping light into Raman gain medium 78 and for providing light to be employed as an active illumination signal on a target area. The tunable laser 72 provides pump light into the Raman gain medium 78 over a plurality of pump wavelengths to induce amplification of an image over a plurality of wavelengths of interest. The pump wavelengths can be removed form the plurality of wavelengths of interest by a pump rejection filter (not shown), as illustrated in FIG. 1. The tunable laser 72 also concurrently provides pump light into a Raman converter 84 to convert the plurality of pump wavelengths to active illumination signals over a plurality of illumination wavelengths that are synchronized to the plurality of wavelengths of interest.

Referring to FIG. 5, light from the tunable laser 72 is provided to a beam splitter 72 that splits the light signal into a first pump signal provided to a beam combiner 76 that combines the first pump signal with a return image signal and a second pump signal provided to a power amplifier 80. The beam combiner 76 is configured to allow light from return image signal at the wavelengths of interest to reflect to the Raman gain medium 78 and allow the light at the pump wavelengths from the tunable laser 72 to pass through the Raman gain medium 78. The pump wavelengths induce Raman gain of the image by the Raman gain medium 78 to provide an amplified image signal at wavelengths of interest. The power amplifier 80 amplifies the second pump signal, which is reflected by a reflecting component 82 to the Raman converter 84. The Raman converter 84 converts the pump light into the illumination signals at the wavelengths of interest synchronized with the wavelengths of interest of the amplified return image signal. The Raman converter 84 can employ the same material as the Raman gain medium 78. It is to be appreciated that the wavelengths of interest can be scanned to a continuous or discrete manner to capture a plurality of images over a plurality of wavelengths of interest. Also, it is to be appreciated that the active illumination system 70 can be employed with a signature spectral database in the same manner as discussed in FIG. 1.

Figure 6:
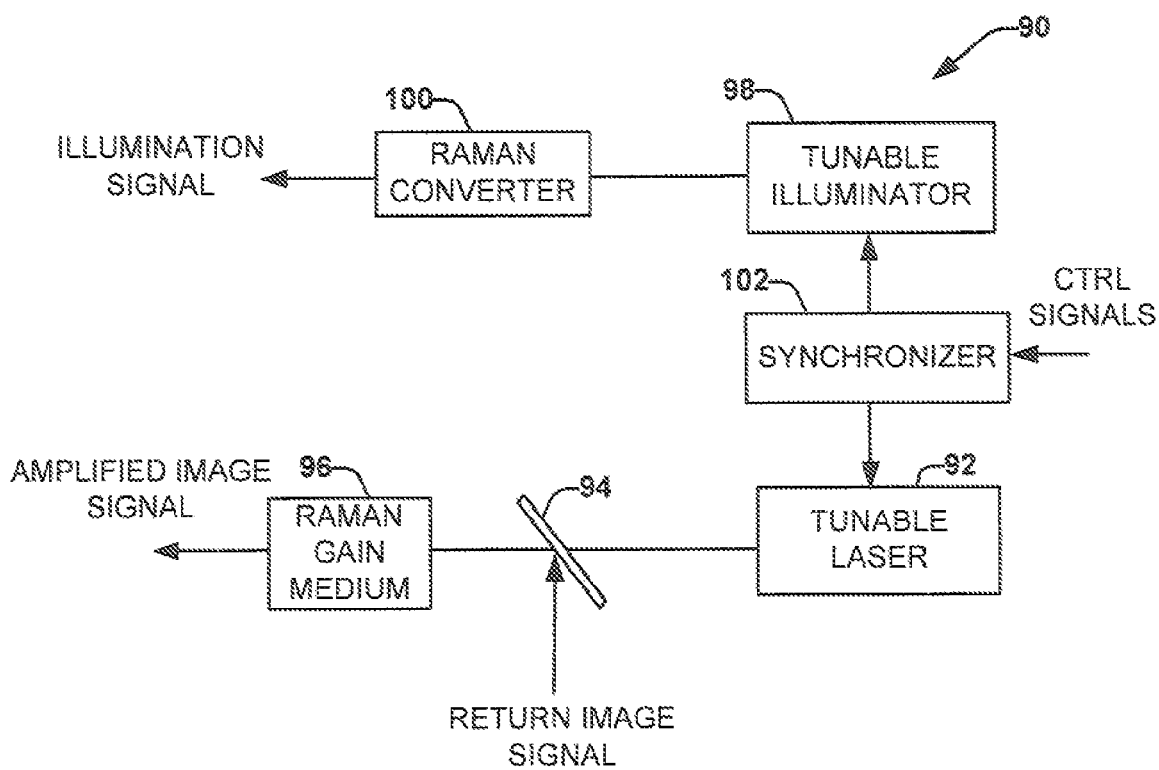
FIG. 6 illustrates a portion of an alternate active illumination image system in accordance with an aspect of the present invention.

FIG. 6 illustrates a portion of an alternate active illumination image system 90 in accordance with an aspect of the present invention. The image system 90 include a tunable laser 92 that acts as a source for pumping light into a Raman gain medium 96, and a tunable illuminator 98 for providing light to be employed as an active illumination signal on a target area. The tunable laser 92 provides pump light into the Raman gain medium 96 over a plurality of pump wavelengths to induce amplification of a return image signal over a plurality of wavelengths of interest. A beam combiner 94 is configured to allow light from a target area at the wavelengths of interest to reflect to the Raman gain medium 96 and allow the light at the pump wavelengths from the tunable laser 92 to pass through the Raman gain medium 96. The pump wavelengths induce Raman gain of the returned image signal by the Raman gain medium 96 to provide an amplified image signal over a plurality of wavelengths of interest. The pump wavelengths can be removed from the plurality of wavelengths of interest by a pump rejection filter (not shown), as illustrated in FIG. 1.

A tunable illuminator 98 provides a plurality of illumination light signals into a Raman converter 100 that converts that plurality of illumination light signal wavelengths to active illumination signals over a plurality of illumination wavelengths that are synchronized to the plurality of wavelengths of interest. The Raman converter 100 can be formed from the same material as the Raman gain medium 96. A synchronizer 102 is coupled to the tunable illuminator 98 and the tunable laser 92 to synchronize the wavelengths of the scanning of the illumination signal with the amplification of the return image signal, and moreover that the induced Raman gain temporal profile overlaps the return image signal after a round trip delay time. The synchronizer 102 is configured to receive control signals and to control the scanning and synchronization of the tunable laser an tunable illuminator based on the control signals, such that the wavelengths of interest for the illumination signal and amplified image signal can be scanned in a continuous or discrete manner. Also it is to be appreciated that the active illumination system 90 can be employed with a signature spectral data base in the same manner as discussed in FIG. 1. In another aspect of the invention, the tunable illuminator 98 can be configured to scan the illumination signal direction at the wavelengths of interest to eliminate the need for the Raman converter 100.

Figure 7:
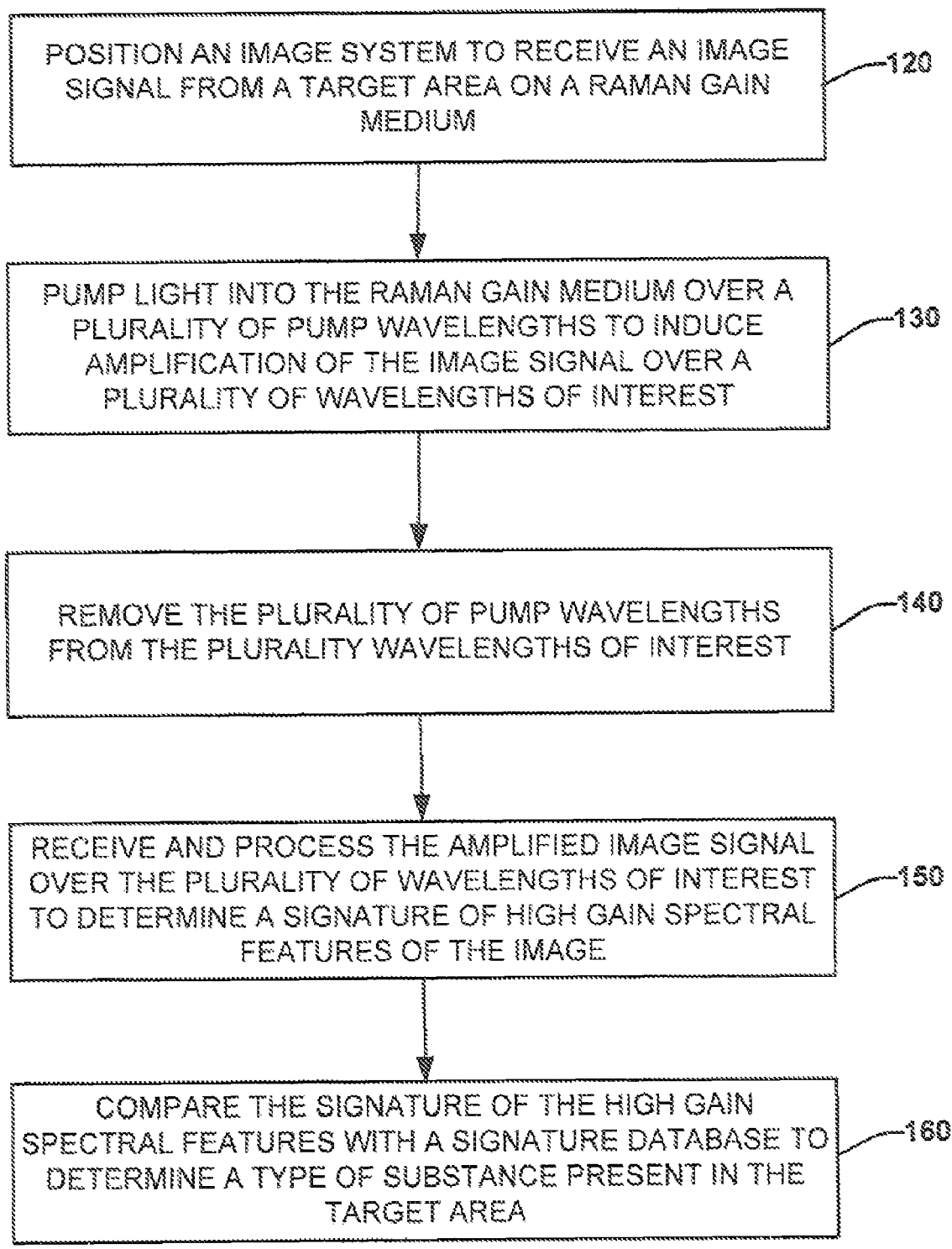
FIG. 7 illustrates a methodology for detecting substances in a target area in accordance with an aspect of the present invention.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 illustrates a methodology for detecting substances in a target area in accordance with an aspect of the present invention. The methodology begins at 120 where an image system is positioned to receive an image signal from a target area on a Raman gain medium. At 130, light is pumped into the Raman gain medium over a plurality of pump wavelengths to induce amplification of the image signal over a plurality of wavelengths of interest. At 140, the plurality of pump wavelengths are removed from the plurality of wavelengths of interest. At 150, the amplified image signal is received and processed over the plurality of wavelengths of interest to determine a signature of high gain spectral features of the image. At 160, the signature of the high gain spectral features is compared with a signature spectral database to determine a type of substance present in the target area. It is to be appreciated that the methodology could include illuminating the target area with an illumination signal over a plurality of illumination wavelengths that are synchronized with the plurality of wavelengths of interest. Additionally, the methodology can include pumping light over a discontinuous manner as to avoid amplification at wavelengths in which the absorption coefficient of the atmosphere is relatively high.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

What is claimed is:

1. An image system comprising:
   a Raman gain medium configured to passively receive an image from a target area, wherein the image comprises at least one of emitted thermal light and scattered incident sunlight;
   a tunable laser configured to pump light into the Raman gain medium over a plurality of first wavelengths to induce amplification of the image over a plurality of second wavelengths stokes shifted from the plurality of first wavelengths; and
   an image detector system that receives and processes the amplified image over the plurality of second wavelengths.

2. The system of claim 1, wherein the Raman gain medium is a single crystal of silicon.

3. The system of claim 1, wherein the Raman gain medium is formed from one of diamond, barium nitrate, silicon carbide, calcium tungstate, germanium, germanium phosphide and lithium niobate.

4. The system of claim 1, wherein the image detector system analyzes a signature of high gain spectral features of the plurality of second wavelengths to determine a type of substance present in the target area.

5. The system of claim 4, wherein the image detector system compares the signature of high gain spectral features of the plurality of second wavelengths to a signature spectral database that contains high gain spectral feature signatures for a plurality of different substance types to determine a type of substance present in the target area.

6. The system of claim 4, wherein the image detector system comprises an image detector and a signal processor, the signal processor calculating intensity values of the image at the plurality of second wavelengths to determine a signature of high gain spectral features of the plurality of second wavelengths wherein the intensity values are dependent on the absorbtion coefficient of the substance present in the target area over the plurality of second wavelengths.

7. The method of claim 6, wherein the tunable laser pumps light into the Raman gain medium over a plurality of pump wavelengths in a spectrally discontinuous manner to induce amplification of the image over the plurality of second wavelengths that avoid wavelengths in which the atmosphere has a relatively high absorption coefficient.

8. The system of claim 1, wherein the system is a passive image system.

9. The system of claim 1, wherein the system scans an illumination signal over the target area over the plurality of second wavelengths in synchronization with the tunable laser over corresponding wavelengths of the plurality of first wavelengths, the plurality of second wavelengths being temporally spaced from corresponding wavelengths of the plurality of first wavelengths based on a round trip delay time of the return image of the illumination signal at respective corresponding wavelengths.

10. The system of claim 9, further comprising a beam splitter that splits the light from the tunable laser into a first light signal provided to the Raman gain medium and a second light signal provided to a power amplifier and a Raman converter to provide the illumination signal over the target area.

11. The system of claim 10, wherein the Raman gain medium and Raman converter are formed from a same Raman crystal type.

12. The system of claim 9, further comprising a tunable illuminator that provides the illumination signal over the target area and a synchronizer that synchronizes the temporal profile of the tunable illuminator to assure that the return signal of the plurality of second wavelengths arrive at the image amplifier substantially simultaneously with the pumping of a corresponding wavelength of the plurality of first wavelengths.

13. An image system comprising:
   a preamplifier comprising a Raman gain medium configured to passively receive an image from a target area, wherein the image comprises at least one of emitted thermal light and scattered incident sunlight, and a tunable laser configured to pump light into the Raman gain medium over a plurality of pump wavelengths to induce amplification of the image over a plurality of wavelengths of interest;
   a combining component that combines the image from the target area and the pump light from the tunable laser; and
   an image detector system that receives and processes the amplified image over the plurality of wavelengths of interest.

14. The system of claim 13, wherein the Raman gain medium is formed from one of silicon, diamond, barium nitrate, silicon carbide, calcium tungstate, germanium, gallium phosphide and lithium niobate.

15. The system of claim 13, wherein the image detector system analyzes a signature of high gain spectral features of the plurality of wavelengths of interest to determine a type of substance present in the target area.

16. The system of claim 15, wherein the image detector system comprises a signal processor that calculates intensity values of the image at the wavelengths of interest to determine a signature of high gain spectral features of the wavelengths of interest wherein the intensity values are dependent on the absorption coefficient of the substance present in the target area over the wavelengths of interest.

* * * * *